Nov. 12, 1968   J. P. FRANK   3,411,004
TWO-PIECE RADIATION DETECTOR OF THE POCKET DOSIMETER TYPE
Filed July 27, 1964
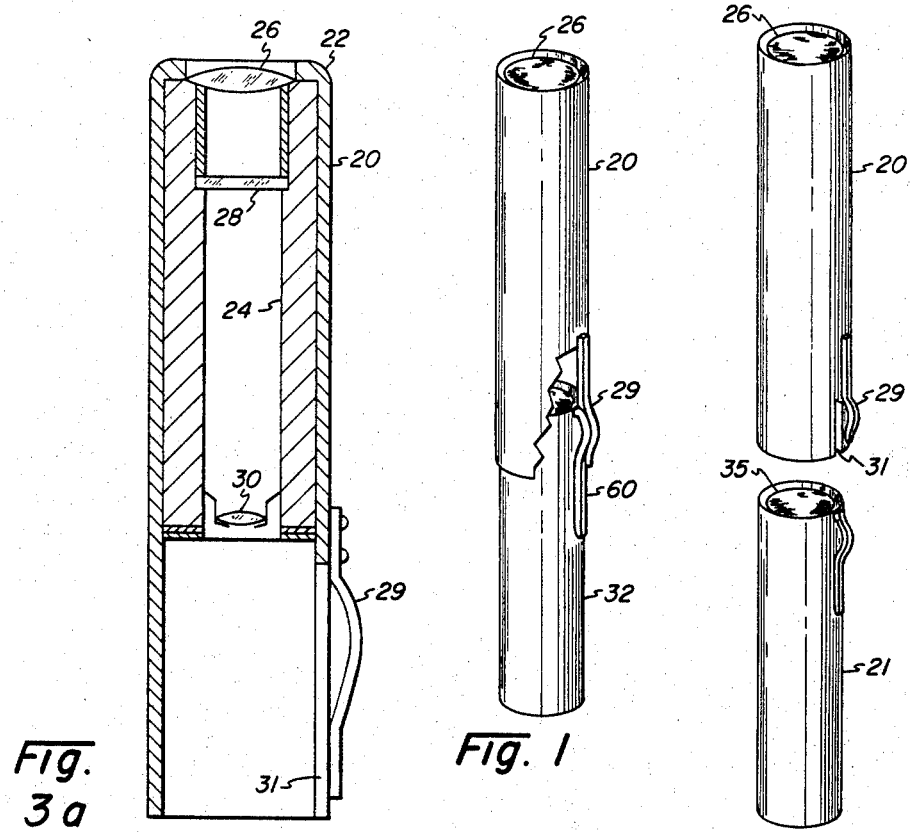
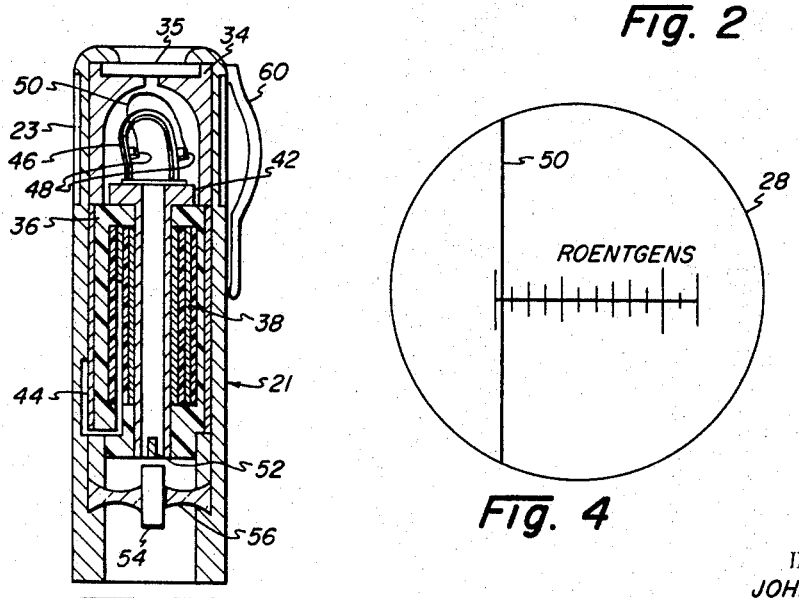
INVENTOR.
JOHN P. FRANK
BY
Richard J. Seeger
ATTORNEY

United States Patent Office 3,411,004
Patented Nov. 12, 1968

3,411,004
TWO-PIECE RADIATION DETECTOR OF THE POCKET DOSIMETER TYPE
John P. Frank, South Fort Mitchell, Ky., assignor to The Bendix Corporation, Cincinnati, Ohio, a corporation of Ohio
Filed July 27, 1964, Ser. No. 385,146
6 Claims. (Cl. 250—83.3)

This invention pertains to a two-piece radiation detector having an eyepiece assembly which is removable from the radiation transducer and electrometer assembly.

The standard components in a radiation unit are the eyepiece assembly which contains in usual from an eyepiece lens, a reticle having radiation units marked thereon, and an objective lens assembly; a radiation transducer such as an ionization chamber wherein ionization is caused by the radiation to be measured; and an electrometer which in common practice has a movable needle or fiber which is responsive to the ionization which takes place in the ionization chamber. While it is usual to combine all of these elements into one unit assembly which can take the form of a portable radiation detector, in many instances it has been found advantageous to separate the detector into two pieces with one piece being used to "read out" a multiplicity of ionization chambers. In this way, ionization chambers can be positioned in many places, including on members of our armed services, and a radiation specialist would be the only one to have the means for measuring the amount of radiation that the ionization chambers have been subjected to. A cost saving results due to the fact that a smaller and less expensive unit could be given to armed service personnel or placed in certain field locations, the units to be carried or placed are much smaller and therefore are more acceptable for carrying or placement, and prevention of radiation reading by nonauthorized personnel is accomplished.

In the past these two-piece radiation detectors were divided so that one piece held the ionization chamber while the other piece held the eyepiece assembly and the electrometer so that when the two pieces were assembled, it was necessary to make an electrical connection between the ionization chamber and the electrometer and when the two pieces were disassembled, it was necessary to break the electrical connection between the ionization chamber and the electrometer. This making and breaking of the electrical contact required recharging of the voltage source in the ionization chamber, which is commonly a capacitor, due to the fact that electrical charge is transferred between the chamber and the meter during the connection of the two pieces. Also, during each connection and disassembly, a certain amount of charge was gained or lost. As a result, the previous two-piece radiation meter could not be used for cumulative readings due to the necessity of this recharging.

This invention improves upon the prior art devices and solves the above mentioned problems by providing a two-piece radiation detector wherein there is no electrical connection involved when the two pieces are assembled or disassembled. This is accomplished by having in one of the pieces the ionization chamber (or other radiation transducer member) and the electrometer while the other piece has the eyepiece assembly which when assembled to the first piece, requires no electrical connection.

Therefore, it is an object of this invention to provide a two-piece radiation detector that can be read as often as desired without recharging, that can be used for reading the total dosage that the ionization chamber has been subjected to regardless of the number of times it has previously been read, and cannot be discharged through negligent handling or excessive assembly and disassembly.

It is an object of this invention to provide a two-piece radiation detector having the ionization chamber and electrometer in one piece and having the eyepiece assembly in the other piece.

It is a further object of this invention to provide one of the pieces in a two-piece radiation detector with a pocket clip and to provide means in the other piece to utilize this pocket clip as a keying member which will align the reticle in the eyepiece assembly in the exact same position to the meter in the other piece of the assembly so that accurate and consistent readings are possible.

These and other advantages will become more apparent when a preferred embodiment is considered in connection with the drawing in which:

FIGURE 1 is a partially broken away view in perspective of a radiation detector of this invention when assembled;

FIGURE 2 is a view in perspective of a radiation detector of this invention when disassembled;

FIGURE 3a is an enlarged cross sectional view of the eyepiece assembly section of a radiation detector of this invention;

FIGURE 3b is an enlarged cross sectional view of an ionization chamber and meter section of the radiation detector of this invention; and FIGURE 4 is a further enlarged view of the reticle of the eyepiece assembly with a view of the fiber as it would appear when viewed through the eyepiece of an assembled radiation detector.

In the drawing is shown a two-piece radiation detector having a first outer housing or barrel 20 for the eyepiece assembly and a second outer housing or barrel 21 for the ionization chamber and meter assembly, both barrels formed of a conductive material such as an aluminum or magnesium alloy or conductive plastic, having a low atomic number, density and thickness to decrease absorption of low energy electromagnetic radiation. A higher density sleeve 23 may be placed around the chamber volume area of barrel 21 to provide for low energy gamma ray or X-ray radiation absorption and to also provide the area density that may be required for beta ray insensitivity that would correspond to recommend biological effectiveness requirements. The requirements of barrel 20 in these respects is not as important as that of barrel 21 since barrel 20 in usual circumstances is disassembled from barrel 21 and therefore is not usually present during the radiation detection.

In this embodiment, the barrels 20 and 21 are circular in cross section, may have a wall thickness of .015 inch in the radiation receiving area and .030 inch near the end areas with the outer diameters being approximately one half inch.

At the upper end of housing 20 is a boss 22 which provides a retaining lip for the eyepiece cylinder 24 which is also tubular in configuration and fits closely inside housing 20. Attached to one end of cylinder 24 is eyepiece lens 26 which is part of a seal at the upper end of tube 20. Spaced axially from eyepiece lens 26 is reticle 28 which has thereon applicable radiation unit markings, as shown in the enlarged view of FIGURE 4. At the lower end of cylinder 24 is attached an objective lens 30.

Fixed, as with rivets, to housing 20 is a spring 29 which is used, as will be later explained, in holding the two-piece detector in assembled relation. Formed beneath spring 29 in housing 20 is a keying slot 31 which is used, as will be later explained, to key the insertion of housing 21 into the open end portion of tube 30 which in FIGURE 3a is at the lower end thereof.

In housing 21 is a concave ionization chamber insert 34, which may be made from a phenolic plastic having graphite particles interspersed to make the insert conductive. Other electrically conductive materials having low atomic numbers may be used. Transparent disc 35 is hermetically sealed to the lip portion of housing 21. Also inserted in housing 21 is tubular insulator 36 which is formed of a radiation resistant, highly insulating material and which abuts the lower end of chamber insert 34. A capacitor 38 formed of alternate layers of insulative and conductive materials is wrapped inside the center recess of insulator 36 with the innermost layer of capacitor 38 being conductive and in surface contact with a conductive sleeve 42 which fits centrally in and is supported by insulator 36. Attached to a conductive layer of capacitor 38 which is separated from the innermost conductive layer by an insulative sheet, is a ground member 44 for making electrical contact with housing 21. The capacitance of capacitor 38 should be suitably large.

Inserted in one end of sleeve 42 is a U-shaped frame 46 formed of a conductive material and having a pair of lugs 48 near each end in which are crimped the ends of a very fine conductive fiber 50 and being of the same general configuration as frame 46.

In the discharged state of capacitor 38, fiber 50 assumes an approximately parallel position to frame 46. However, in a fully charged state of capacitor 38, which may be 150 volts, the fiber 50 is repelled from the frame 46 to its furthest position from frame 46 since both the fiber and frame are at the same voltage level and are of like sign. This high voltage of the same polarity on both the frame 46 and fiber 50 causes a mutual repelling force and at this point fiber 50 is at maximum deflection and indicates a reading of zero roentgens on the scale of reticle 28. In FIGURE 4, fiber 50 is displaced slightly from the zero mark on the scale of the reticle indicating a corresponding slight amount of radiation.

When the gas surrounding frame 46 and fiber 50 is subject to radiation, it is ionized with the negative ions being attracted to the highly positive potential of the frame and fiber thereby discharging the capacitor 38 by an amount corresponding to the ionization. The lower the charge on capacitor 38, the less repulsion there will be between frame 46 and fiber 50 thereby causing fiber 50 to move to the right along the scale shown in FIGURE 4 indicating a higher radiation reading. Therefore, discharge of the capacitor 38 results in a higher radiation reading.

In the two-piece radiation detectors of the prior art, this discharge of capacitor 38 occurred not only for radiation but also when the two pieces were assembled or disassembled thereby requiring a complete recharging of the capacitor 38, by means to be next explained, every time a reading was taken. This, of course, prevented reading of any radiation which occurred before a previous reading thereby severely limiting the use of the detector. As will be explained, assembly and disassembly of the two-piece detector of this invention in no way affects the charge on capacitor 38.

Formed at the lower end of sleeve 42 is a transverse conductive bar 52 and aligned with bar 52 is a charging pin 54 which is held in such alignment by a resilient, light conducting disc 56. Disc 56 permits longitudinal movement of pin 54, is of transparent or light conducting material, is insulative, and is hermetically sealed at its periphery to barrel 21. The pressure in barrel 21 is atmospheric but it could, of course, be varied to suit a particular condition. The purpose of resiliently mounting pin 54 is to provide communication between an external charging device, not shown, and bar 52 when barrel 21 is in pressure contact with the charging device. In this manner the only time that pin 54 is in contact with transverse bar 51 is when it is in pressure contact with a charging device and therefore discharge of capacitor 38 through pin 54 is very unlikely. During charging, the negative terminal of the charging device is connected to barrel 21. As mentioned, transverse bar 52 is in electrical contact with sleeve 42 which is in turn in electrical contact with the innermost conductive layer of capacitor 38 thereby forming the conductive path during charging.

Fixed to the outer surface of barrel 21 is spring clip 60 which may be used for a pocket clip. Further, spring clip 60 is used to insure proper alignment between barrels 20 and 21 when they are assembled so that fiber 50 is always in proper relation to the scale on reticle 28. This is accomplished since barrel 21 cannot be inserted into barrel 20 unless clip 60 is aligned with slot 31 in barrel 20. During insertion, hold down spring 29 is lifted over, and when fully inserted, fits closely on clip 60, as shown in FIGURE 1, to maintain the units in assembled relation. In the assembled position there is no electrical contact made with capacitor 38 and therefore no discharge thereof will occur. Likewise, when barrels 21 and 20 are disassembled, no electrical connection is made or broken with capacitor 38 and hence discharge will not occur. Because of this, the capacitor 38 need not be recharged after every reading although, of course, it can be if it is desired to reset the fiber 50 on the zero mark of reticle 28. This greatly increases the versatility and usefulness of this radiation detector.

Although this invention has been disclosed and illustrated with reference to particular applications, the principles involved are susceptible of numerous other applications which will be apparent to persons skilled in the art. For example, there are several types of detectors other than ionization chambers which can be used with an electrometer to form the one piece of the invention. These detectors include the Semirad detector developed by Kronenberg and H. Murphy, the self-powered Roentgen element dosimeter developed by Hosemann and Warrikhoff, the Compton dosimeter developed by Gross and P. Murphy, and various solid state detectors that may use an electrometer as an indicator. The invention is, therefore, to be limited only as indicated by the scope of the appended claims.

Having thus described my invention, I claim:

1. Apparatus for measuring radiation comprising
chamber means in which ionization takes place due to radiation to be detected,
frame means situate in said chamber means,
fiber means being flexible and being connected to said frame means,
means for causing said flexible fiber means to be repelled from said frame means, said ionization causing said fiber means to move a corresponding degree closer to said frame means, the position of said fiber means relative to said frame along a given direction being thus representative of the radiation encountered,
a first elongated housing,
said chamber means, frame means, fiber means, and means for causing said flexible fiber means to be repelled from said frame means being in said first housing, said housing being light transmitting along its axis and said fiber responding in said given direction transverse said axis,
a second elongated housing attachable to and removable from said first housing by readily separable telescopic coaxial engagement therewith,
a light transmitting eyepiece assembly being in said second housing along the axis thereof and comprising a reticle therein having radiation unit markings thereon along a given direction transverse the axis of said second housing,
means for locating said first and second housing in a predetermined rotational registration upon telescopic engagement wherein the reticle in said second housing is aligned with the frame means in said first housing whereby the direction of fiber means displacement coincides with the direction of corresponding displacement of the radiation unit indication markings on the reticle so they are superimposed upon viewing along the axis of the assembled first and second housings.

2. The apparatus of claim 1 with
said means for locating said first and second housings comprising means for locating said housings both in longitudinal dimension and in angular direction about the axes of the first and second housings.

3. The apparatus of claim 1 with
said eyepiece assembly further comprising an eyepiece lens being on one side of said reticle and longitudinally spaced therefrom and an objective lens being on the other side of said reticle and longitudinally spaced therefrom.

4. The apparatus of claim 1 with
said means for causing said flexible fiber means to be repelled from said frame means comprising capacitor means,
contact means adapted for use in charging said capacitor means being hermetically sealed at one end of said first housing,
said contact means being electrically engageable with said capacitor means during charging and electrically disengageable from said capacitor means to terminate the charging thereby minimizing any charge leakage during non charging condition.

5. The apparatus of claim 1 with
said locating means comprising a longitudinal slot in one of said first and second housings and a key in the other of said first and second housings, said key engageable with said slot.

6. The apparatus of claim 5 with
said key comprising a flat spring having a locating notch therein and said flat spring having one end connected at said other housing and having a free end which is spring urged against an outside surface of said other housing to provide a pocket clip,
a second spring overlying said longitudinal slot and being attached to said one housing and having a locating notch that is registrable with the locating notch of the spring of said other housing.

References Cited

UNITED STATES PATENTS

| 2,841,716 | 7/1958 | Rich | 250—83.3 |
| 2,905,742 | 9/1959 | Woods | 174—35.5 |
| 3,028,444 | 4/1962 | Staver | 174—35.5 |
| 3,160,698 | 12/1964 | Frey | 88—39 |

FOREIGN PATENTS

| 715,408 | 9/1954 | Great Britain. |

ARCHIE R. BORCHELT, *Primary Examiner.*